United States Patent [19]

Pearson

[11] Patent Number: 4,478,555
[45] Date of Patent: Oct. 23, 1984

[54] BACK PRESSURE COMPENSATOR FOR APPARATUS FOR CONTROLLING LIQUID LEVEL IN A RESERVOIR

[75] Inventor: William S. Pearson, Hampstead, Md.

[73] Assignee: Cyrpo, Incorporated, Hampstead, Md.

[21] Appl. No.: 409,323

[22] Filed: Aug. 18, 1982

[51] Int. Cl.³ .............................................. F04B 41/06
[52] U.S. Cl. .......................................... 417/7; 417/12; 417/38; 200/183
[58] Field of Search .................... 417/12, 36, 8, 38, 40, 417/41, 37, 305, 3-7; 137/389, 390; 200/85 R, 182, 183, 187, 220

[56] References Cited

U.S. PATENT DOCUMENTS 4,207,030  9/1976  Pearson .

Primary Examiner—Edward K. Look
Attorney, Agent, or Firm—Hill, Van Santen, Steadman & Simpson

[57] ABSTRACT

A compensating device which includes a weighted lever adapted to be selectively disposed in restraining relation to a trip arm of an electrical switch controlling member responsive to head pressure in a reservoir main for cutting in or cutting out reservoir filling pumps, and operating for selectively delaying pump cut-out.

13 Claims, 5 Drawing Figures

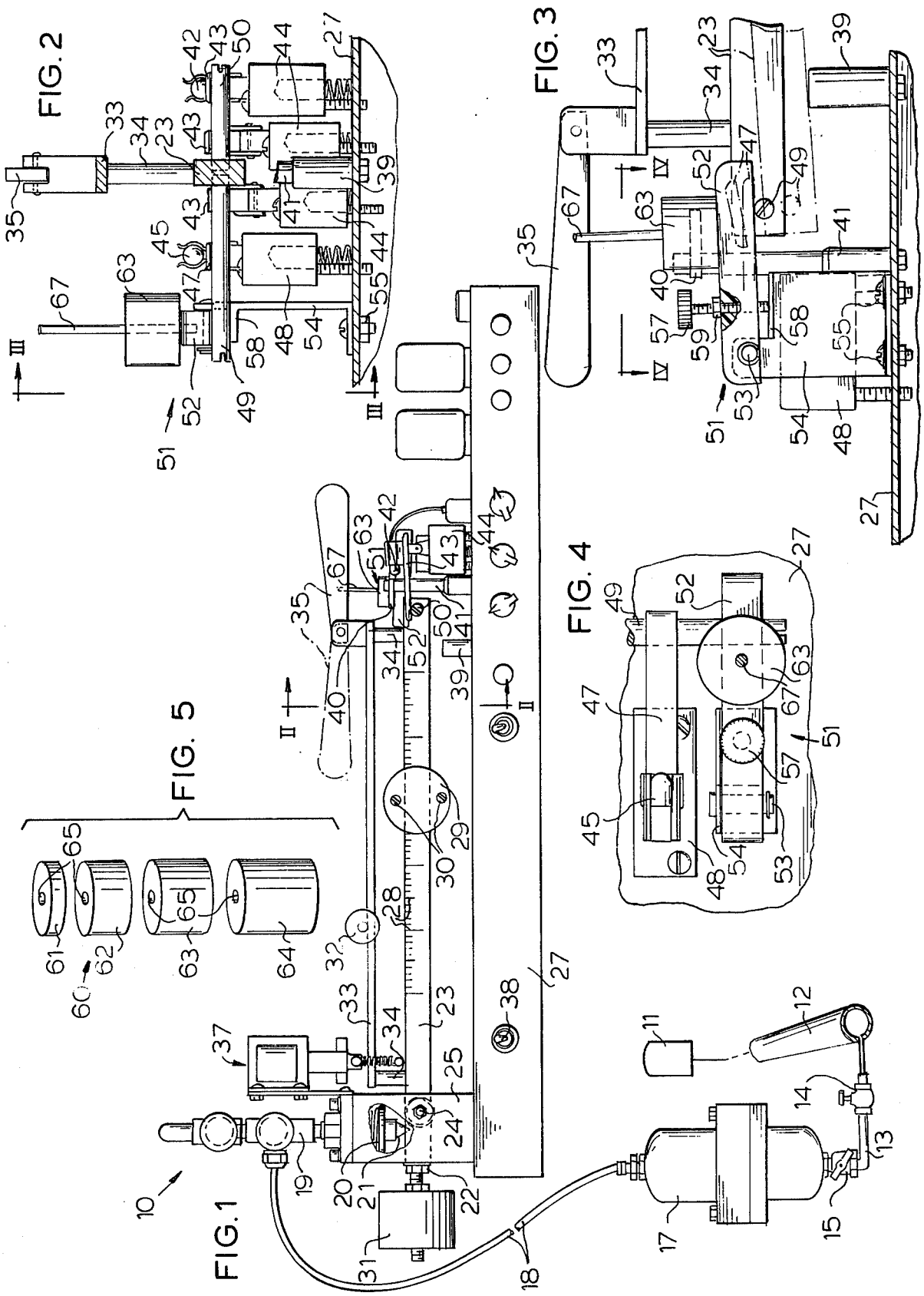

BACK PRESSURE COMPENSATOR FOR APPARATUS FOR CONTROLLING LIQUID LEVEL IN A RESERVOIR

This invention relates to apparatus for controlling liquid level in a reservoir, and is more particularly concerned with improvements in apparatus of the type covered in U.S. Pat. No. 4,207,030, granted to the present applicant, and incorporated herein by reference.

In that patent, apparatus is disclosed having means responsive to head pressure in a main communicating with a reservoir which is intermittently supplied by pump means having electrical control switch means, for automatically controlling predetermined liquid in the reservoir by operation of switch tripping means to activate the electrical control switch means for pump means cut-in upon drop in the liquid level and for pump means cut-out when the liquid level is reached.

Substantial commercial success has been experienced with the patented apparatus, especially for controlling water level in municipal reservoirs.

Although the apparatus is equipped to service a substantial range of predetermined reservoir liquid levels, so that field adjustments can be made for particular reservoirs with which the apparatus may be associated, installations have been encountered in which due to small piping or distant pumping, abnormal back pressure may exist beyond the normal operating range or differential of the switch tripping means of the apparatus.

There may be situations where a selectively greater variation in reservoir or tank water level is desired than the differential, i.e., the difference between the high and low level in the reservoir or tank, attainable in accordance with the original control setting of the apparatus for pump cut-in and pump cut-out.

It is therefore an important object of the present invention to meet at least the two above-mentioned unusual situations or conditions in a simple, convenient manner by the addition of a simple auxillary mechanism to the patented apparatus.

To this end, the present invention provides in apparatus having means responsive to head pressure in a main communicating with a reservoir which is intermittently supplied by pump means having electrical control switch means, for automatically controlling predetermined liquid level in the reservoir by operation of switch tripping means to activate said switch means for pump means cut-in upon drop in said liquid level and for pump means cut-out at said predetermined liquid level, the improvement comprising means for selectively restraining said switch tripping means for delaying said pump means cut-out to compensate for abnormal back pressure in said main tending to cause premature pump means cut-out operation of said tripping means at less than said liquid level, or for selectively increasing the liquid level differential between pump means cut-in and pump means cut-out.

Other objects, features and advantages of the invention will be readily apparent from the following description of a representative embodiment thereof, taken in conjunction with the accompanying drawing, although variations and modifications may be effected without departing from the spirit and scope of the novel concepts embodied in the disclosure and in which:

FIG. 1 is a partially schematic side elevational view of apparatus embodying the invention;

FIG. 2 is a fragmentary vertical sectional detail view taken substantially along the line II—II of FIG. 1;

FIG. 3 is a fragmentary sectional elevational view taken substantially along the line III—III in FIG. 2;

FIG. 4 is a fragmentary, sectional top plan view taken substantially in the plane of line IV—IV in FIG. 3; and FIG. 5 is a perspective view of a set of weights for attaining various results with the restraining device of the present invention.

Apparatus 10 (FIG. 1), essentially in accordance with U.S. Pat. No. 4,207,030, is operative for automatically controlling predetermined liquid level in a reservoir 11 in response to head pressure in a main 12 communicating with the reservoir. The head pressure is tapped from the main 12 through a pipe 13 controlled by a shut-off valve 14. From the pipe 13, the head pressure is communicated past a bleeder valve 15 with a monitoring cell 17 which forms part of a hydraulic transmission system including a duct 18 leading from the cell 17 and coupled to a fitting 19 which effects communication with an expansible bellows actuator 20 having a pressure transmission projection 21 thrusting against a relatively short tail portion 22 of a long lever scale beam 23 carried by a horizontal pivot 24 on a supporting bracket 25 mounted on a base 27.

On the pivoted beam 23 is provided calibration indicia 28 indicating a weight pressure scale in pounds or kilograms, as preferred, and along which a selector weight 29 is adapted to ride slidably for adjustment and adapted to be locked by means of lock screws 30 in a preferred adjustment to work in conjunction with a counterweight 31 on the end of the beam tail 22 for controlling the attitude of the beam 23 in relation to the functioning of the actuator 20. Fine tuning of the adjustment is adapted to be effected by means of a weight 32 carried by an auxillary beam bar 33 mounted on the beam 23 by means of spacer column studs 34. A retractable beam extension lever 35 is mounted on the end of the bar 33 adjacent the distal end of the beam 23. The lever 35 is normally in an extended position, as shown in full line. When a standby condition is desired, the lever 35 is retracted to the dot-dash position. A clock operated automatic water level drop control device 37 carried by the bracket 25 and operatively connected with the adjacent end of the bar 33 may be provided in the apparatus. An on/off switch 38 is provided for controlling the device 37. Adjacent to its distal end, the range of up and down swinging movement of the beam 23 is limited by an underlying limit stop 39 and by an overlying limit stop 40 carried by a post 41.

Pumps for intermittently supplying the reservoir 11 are adapted to be controlled through electrical control switch means mounted on the base 27 and adapted to be operated by the control lever 23. For this purpose, as shown, each pump is controlled by a separate mercury switch 42 mounted on a trip lever finger 43 pivotally carried by a vertically adjustable mounting block 44. In addition, a holding switch 45 is mounted on a trip lever 47 rockably carried by a vertically adjusted mounting block 48 supported by the base 27. The several switches are mounted at respective elevations designed to provide pump control best suited for the particular installation. All of the switch trip levers 43 and 47 overlie switch tripping means carried by the distal end portion of the control lever beam 23 and desirably in the form of a trip arm 49 projecting horizontally laterally from one side of the beam 23, and a trip arm 50 projecting from the opposite side of the beam 23 coaxially aligned with the arm 49. As best seen in FIG. 2, two of the trip levers 43 overlie the arm 50, and one of the trip levers 43 and the trip lever 47 overlie the arm 49.

When the reservoir 11 is full to the predetermined liquid level, the actuator 20 acts to hold the switch controlling end of the beam 23 elevated, whereby the trip arms 49 and 50 hold the overlying trip levers 43 and 47 swung upwardly in which position the switches 42 and 45 are open and the pumps are cut-out. Upon dropping of the water level in the reservoir 11, the switch control end of the beam 23 is permitted to drift downwardly proportionately until the hold switch 45 is closed, thus preparing the pump controlling circuits in which the switches 42 are connected. Further downward drifting of the beam 23 effects successive closing of the switches 42 for cut-in of the pumps until the predetermined liquid level has been restored in the reservoir 11, whereupon the pump are again cut out by uptilting of the switches by the trip arms 49 and 50.

According to the present invention, means 51 mounted separate from the switch tripping means are provided for selectively restraining the switch tripping means beam 23 for delaying pump cut-out to compensate for abnormal back pressure in the main 12 tending to cause premature pump cut-out operation of the switch tripping means at less than the desired liquid level in the reservoir 11, and for selectively increasing the differential beyond the original operating control range for which the apparatus has been adjusted or set. To this end, the restraining means 51 comprises a restraining lever 52 mounted as by means of a pivot 53 on an angle bracket 54 secured as by means of screws 55 to the base 27 at a location generally aligned with and adjacently spaced from the switch mounting block 48. The restraining lever 52 is of a length to extend into overlying relation to and in operation to ride upon the trip arm 49 which for this purpose is of a length to extend laterally from the beam 23 a sufficient distance to accommodate this purpose, as best seen in FIG. 2. A position limiting adjustment means thumb screw 57 is threaded downwardly through the lever 52 so that a lower end of the screw below the lever will engage a lateral stop flange shoulder 58 provided for this purpose on the bracket 54. When proper adjustment has been attained with the screw 57 a lock nut 59 on the shank of the screw 57 under its head is tightened against the top of the lever 52. In a practical arrangement, the lever 52 has been adjusted to be contacted by the arm 49 when the distal end of the beam 23 is about ¼ inch from the uppermost stop 40. Tripping and opening of the holding switch 45 is effected after the beam end has travelled, i.e., swung, upwardly to about ⅛ inch from the stop 40.

In order to provide for various back pressure conditions or when it is desired to increase the operating range or differential, selective weight means corelated with predetermined main pressure increments are provided for the restraining lever 52. Conveniently such weight means comprise a set of weights 60 (FIG. 5) graduated in size according to a desirable range of pound increments of water pressure. By way of example, a weight 61 is identified for one pound water pressure, there also being a "two pound" weight 62, a "three pound" weight 63, and a "four pound" weight 64. In a practical arrangement, the actual weight of the weights 61-64 has been 27 grams, 54 grams, 81 grams, and 108 grams, respectively. Each of the weights 61-64 has a central hole 65 therethrough by which it is adapted to be retained in place on top of the override lever 52 by slipping the weight over an upstanding locating pin 67 carried by the override lever. The arrangement is such that for each "pound" weight employed, there will be, for example, an additional 2.3 feet of water in the reservoir 11. Therefore, if it is determined that there is a one pound back pressure in the pumping water supply system, as detected in the main 12, and which back pressure will lower the maximum capacity of the apparatus 10 to attain a predetermined water level in the reservoir 11, the "one pound" weight 61 will be mounted on the override lever 52, and so on, for a two pound back pressure the "two pound" weight 62, for a three pound back pressure the "three pound" weight 63, and for a four pound back pressure the "four pound" weight 64. Of course, any greater back pressure can be compensated for by combining the weights 60 in any combination to compensate for the particular back pressure.

The same relationship of the weights to the restraining lever 52 will prevail where it is desired to increase the differential beyond the capability of the original control. When it is desired to return to normal, the weight or weights are lifted from the restraining lever 52 and the lever 52 is swung into inactive position away from the trip arm 49.

In the operation of the compensating or restraining means device 51, the weighted restraining lever 52 in its overhanging relation to the trip arm 49 is engaged by the trip arm as the actuator 20 causes the beam 23 to swing upwardly toward the pump cut-out switch tripping position. As the trip arm 49 engages the restraining lever 52, upward swinging of the beam 23 is delayed proportionate to the selected weight 60 carried by the lever 52 until the liquid level in the reservoir 11 has been reached which will reference a line pressure to actuator 20 to overcome the weight and thus cause the beam 23 through the trip arm 49 to raise the lever 52 sufficiently to raise the switch trip lever for opening the switches and cutting out the pumps as the desired liquid level in the reservoir 11 is attained. When the desired liquid level in the reservoir 11 drops, pump cut-in, and then upon refilling pump cut-out, proceed in regular fashion within the operating parameters of the apparatus 10, as modified by the device 51. Whenever appropriate, of course, the device 51 may be selectively disabled by moving the restraining arm lever 52 into inactive position, from which the arm lever can simply be selectively swung back into its restraining position.

It may be observed that inherently the device 51 functions without changing pump cut-in by operation of the switch tripping means including the lever 23 and the trip arm 49.

It will be understood that variations and modifications may be effected without departing from the spirit and scope of the novel concepts of this invention.

I claim as my invention:

1. In apparatus having means responsive to head pressure in a main communicating with a reservoir which is intermittently supplied by pump means having electrical control switch means, for automatically controlling predetermined liquid level in the reservoir by operation of switch tripping means to activate said switch means for pump means cut-in upon drop in said liquid level and for pump means cut-out at said predetermined liquid level, the improvement comprising:

means mounted separate from said switch tripping means, and having a device operable for selectively restraining said switch tripping means for delaying said pump means cut-out to compensate for abnormal back pressure in said main tending to cause premature pump means cut-out operation of said tripping means at less than said liquid level, and also operable for selectively increasing the differential between pump means cut-in and pump means cut-out, without changing pump means cut-in by operation of said switch tripping means.

2. Apparatus according to claim 1, wherein said means for restraining comprises a pivoted lever which is adapted to be swung as desired between a restraining position and an inactive position relative to said switch tripping means.

3. Apparatus according to claim 2, wherein said switch tripping means comprises a generally vertically moveable member having a switch tripping arm, and said pivoted lever is adapted to ride on said arm in the restraining position of the lever.

4. Apparatus according to claim 2, wherein said apparatus includes a base supporting both said switch tripping means and said means mounted separate from said switch tripping means, and said means mounted separate from said switch tripping means including a bracket supported by said base and mounting said pivoted lever.

5. Apparatus according to claim 4, wherein said bracket has a shoulder below said pivoted lever in the restraining position of the lever, and an adjustment screw on said lever adapted to engage said shoulder.

6. Apparatus according to claim 1, including means for adjusting said device relative to said switch tripping means.

7. Apparatus according to claim 1, including selectively adjustable weight means associated with said device and corelated with predetermined main pressure increments.

8. Apparatus according to claim 7, wherein said device comprises a member adapted to ride said switch tripping means, and said weight means comprises a set of graduated weight elements, said member having means for retaining selected weight elements in position thereon.

9. Apparatus according to claim 8, wherein said position retaining means comprises an upstanding pin, and said weight elements having pin holes therein for reception of said pin therethrough.

10. Apparatus according to claim 1, comprising a base supporting said switch tripping means, said switch tripping means including a generally horizontally extending trip arm, said restraining means comprising an assembly including an upstanding bracket supported on said base, a restraining lever adapted to ride on said trip arm, means pivotally connecting said restraining lever to said bracket so that the lever is adapted to be pivotally swung between a restraining position over said trip arm and an inactive position separated from said trip arm, an upwardly facing shoulder underlying the trip arm overlying position of said lever, an adjustment screw carried by said lever and adjustably engageable with said shoulder, an upstanding pin on said lever, and a set of graduated weights having pin receiving apertures therein and adapted to be selectively received on said lever with said pin extending through the apertures.

11. In apparatus having means responsive to head pressure in a main communicating with a reservoir which is intermittently supplied by pump means having electrical control switch means, for automatically controlling predetermined liquid level in the reservoir by operation of switch tripping means to activate said switch means for pump means cut-in upon drop in said liquid level and for pump means cut-out at said predetermined liquid level, the improvement comprising:

means for selectively restraining said switch tripping means for delaying said pump means cut-out to compensate for abnormal back pressure in said main tending to cause premature pump means cut-out operation of said tripping means at less than said liquid level, and also operable for selectively increasing the differential between pump means cut-in and pump means cut-out;

selectively adjustable weight means corelated with predetermined main pressure increments;

said restraining means comprising a member adapted to ride said switch tripping means;

said weight means comprising a set of graduated weight elements;

and means on said member for retaining selected weight elements in position thereon.

12. Apparatus according to claim 11, wherein said position retaining means comprises an upstanding pin, and said weight elements having pin holes therein for reception of said pin therethrough.

13. In apparatus having means responsive to head pressure in a main communicating with a reservoir which is intermittently supplied by pump means having electrical control switch means, for automatically controlling predetermined liquid level in the reservoir by operation of switch tripping means to activate said switch means for pump means cut-in drop in said liquid level and for pump means cut-out said predetermined liquid level, the improvement comprising:

means for selectively restraining said switch tripping means for delaying said pump means cut-out to compensate for abnormal back pressure in said main tending to cause premature pump means cut-out operation of said tripping means at less than said liquid level, and also operable for selectively increasing the differential between pump means cut-in and pump means cut-out;

a base supporting said switch tripping means;

said switch tripping means including a generally horizontally extending trip arm;

said restraining means comprising an assembly including an upstanding bracket supported on said base, a restraining lever adapted to ride on said trip arm, means pivotally connecting said restraining lever to said bracket so that the lever is adapted to be pivotally swung between a restraining position over said trip arm and an inactive position separated from said trip arm, an upwardly facing shoulder underlying the trip arm overlying position of said lever, an adjustment screw carried by said lever and adjustably engageable with said shoulder, and an upstanding pin on said lever;

and a set of graduated weights having pin receiving apertures therin and adapted to be selectively received on said lever with said pin extending through the apertures.

* * * * *